United States Patent [19]
Clancy et al.

[11] 3,788,418
[45] Jan. 29, 1974

[54] SYSTEM FOR COOLING AN HYDRAULIC EXCAVATOR

[75] Inventors: Lawrence F. Clancy, Peoria; Emil B. Lee, Jr., Morton; William O. Smart, Dunlap; John W. Yancey, Aurora, all of Ill.

[73] Assignee: Caterpillar Tractor Co., Peoria, Ill.

[22] Filed: Apr. 6, 1972

[21] Appl. No.: 241,757

[52] U.S. Cl............................. 180/68 R, 180/54 A
[51] Int. Cl............................................. B60k 11/00
[58] Field of Search .... 180/54 A, 54 F, 66 R, 68 R, 180/68 P, 54 R; 37/DIG. 7, DIG. 9, DIG. 10, DIG. 11

[56] References Cited
UNITED STATES PATENTS

| 3,099,098 | 7/1963 | Davis | 180/66 R X |
| 2,712,876 | 7/1955 | Kuehn, Jr. | 180/66 R UX |
| 2,393,324 | 1/1946 | Joy | 180/66 R X |
| 3,334,704 | 8/1967 | Gerhrke et al. | 180/68 R |

FOREIGN PATENTS OR APPLICATIONS

| 710,588 | 6/1954 | Great Britain | 180/54 A |

Primary Examiner—Kenneth H. Betts
Assistant Examiner—Milton L. Smith
Attorney, Agent, or Firm—Leonard Phillips et al.

[57] ABSTRACT

The body of an hydraulic excavator is divided into two separate compartments. The first and rearward compartment contains the prime mover engine with the hydraulic system pumps directly associated therewith. Air is drawn through one side inlet in the body across an hydraulic system heat exchanger and the engine coolant radiator by means of a fan mounted therebehind, and from thence across the engine and associated hydraulic pumping mechanisms. The air in this after compartment is thereafter exhausted through vents in the roof, the opposite side wall and the floor portions of the body. In a second compartment forward of the engine compartment is situated the hydraulic system fluid reservoir, valving and other hydraulic circuitry for the excavator vehicle. Openings in at least one side wall of the body, the roof and floor portions thereof permit air to circulate freely over these hydraulic components of the vehicle. A transverse fire wall separates the two compartments in the body and further serves to isolate engine and pump noise from the operator's station located in a cab portion at the front lefthand side of the body.

6 Claims, 4 Drawing Figures

SYSTEM FOR COOLING AN HYDRAULIC EXCAVATOR

BACKGROUND OF THE INVENTION

In recent years all-hydraulic excavators and crane vehicles have appeared on the market. While deriving their power from a prime mover such as a diesel engine, such vehicles are actually driven through an all hydraulic pump and motor system, all vehicle motions are hydraulically actuated as is the implement attachment actually utilized to accomplish the work desired. It will be apparent then that the demands placed upon the hydraulic system in such a vehicle is quite severe, and it is also apparent that these demands induce high heat loads in the hydraulic fluid and the associated mechanism. Sufficient cooling and heat exchanging mechanisms are therefore quite necessary in the design of any such all hydraulic excavator vehicle.

The myriad hydraulic circuits with their many connections and conduits also present many points of hazard should a malfunction occur. Hot hydraulic fluid under high pressure may be released and thereby present a dangerous fire hazard if it comes into contact with any high temperature surfaces.

It is therefore extremely important to provide an efficient, and if possible, isolated cooling system for the heat generating components of such vehicles.

BRIEF SUMMARY OF THE INVENTION

The present invention therefore relates to a cooling system for hydraulic excavators and more specifically to a highly efficient cooling system wherein cooling is provided not only for the prime mover engine, but for the hydraulic fluid as well, while at the same time means are provided for minimizing the hazards accompanying the accidental escape of hot high temperature hydraulic fluid from the hydraulic system valves and associated circuitry.

It is therefore an object to provide a cooling system for an all-hydraulic excavator vehicle.

It is a further object of the invention to provide a system for an all-hydraulic excavator vehicle wherein various hydraulic components thereof are isolated from the hot surfaces of the prime mover engine.

It is still another object of the invention to provide a cooling system for an hydraulic excavator vehicle wherein the hydraulic system reservoir and valves are physically isolated from the vehicle prime mover, and the hydraulic system pumps.

Further objects and advantages of the invention will be understood from a review of the following description as well as the accompanying drawing in which.

DESCRIPTION OF THE PREFERRED EMBODIMENT

Figure 1:
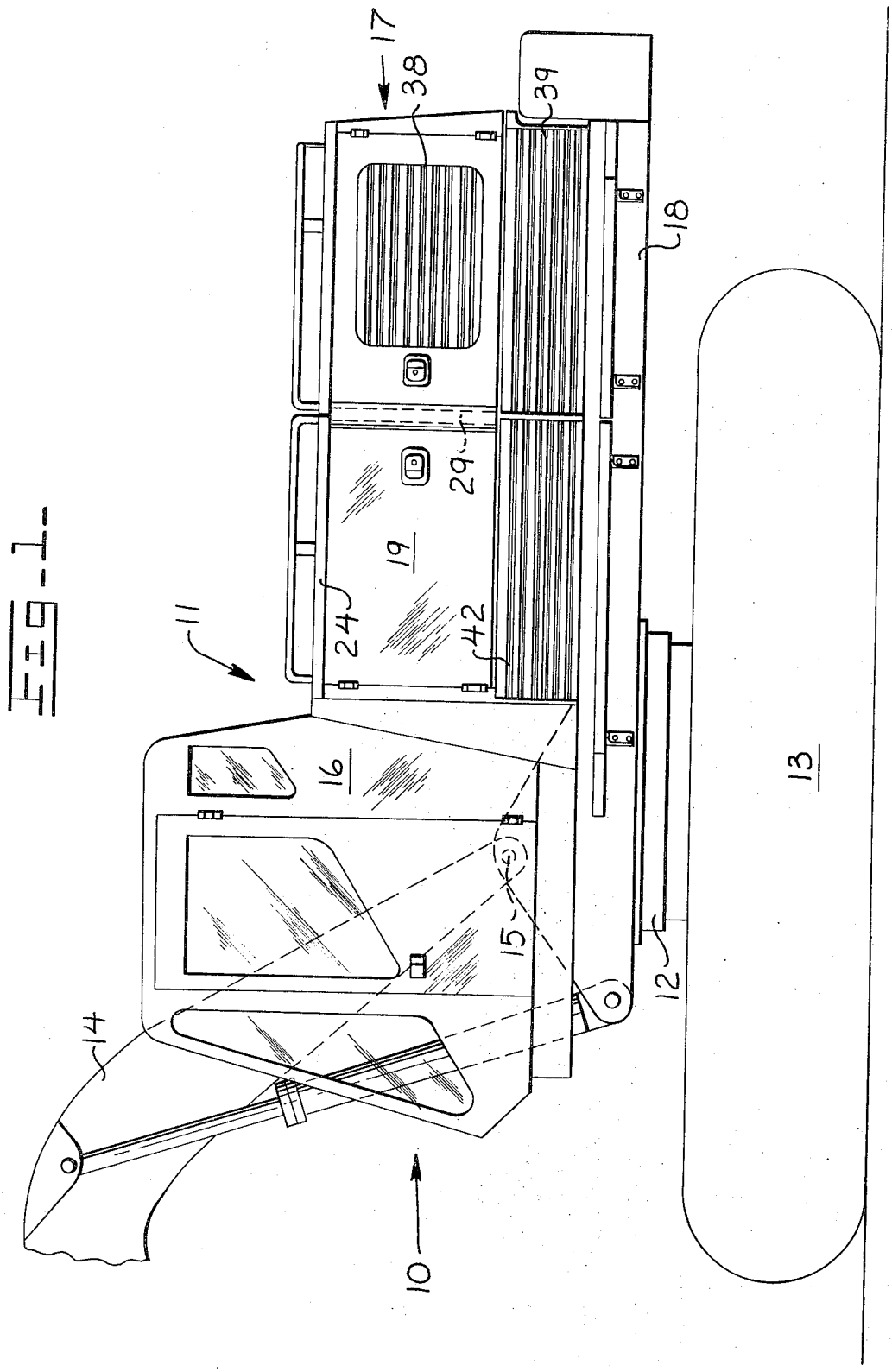
FIG. 1 is a schematic elevation of the left hand side of an hydraulic excavator vehicle showing the cooling air inlets.
Figure 2:
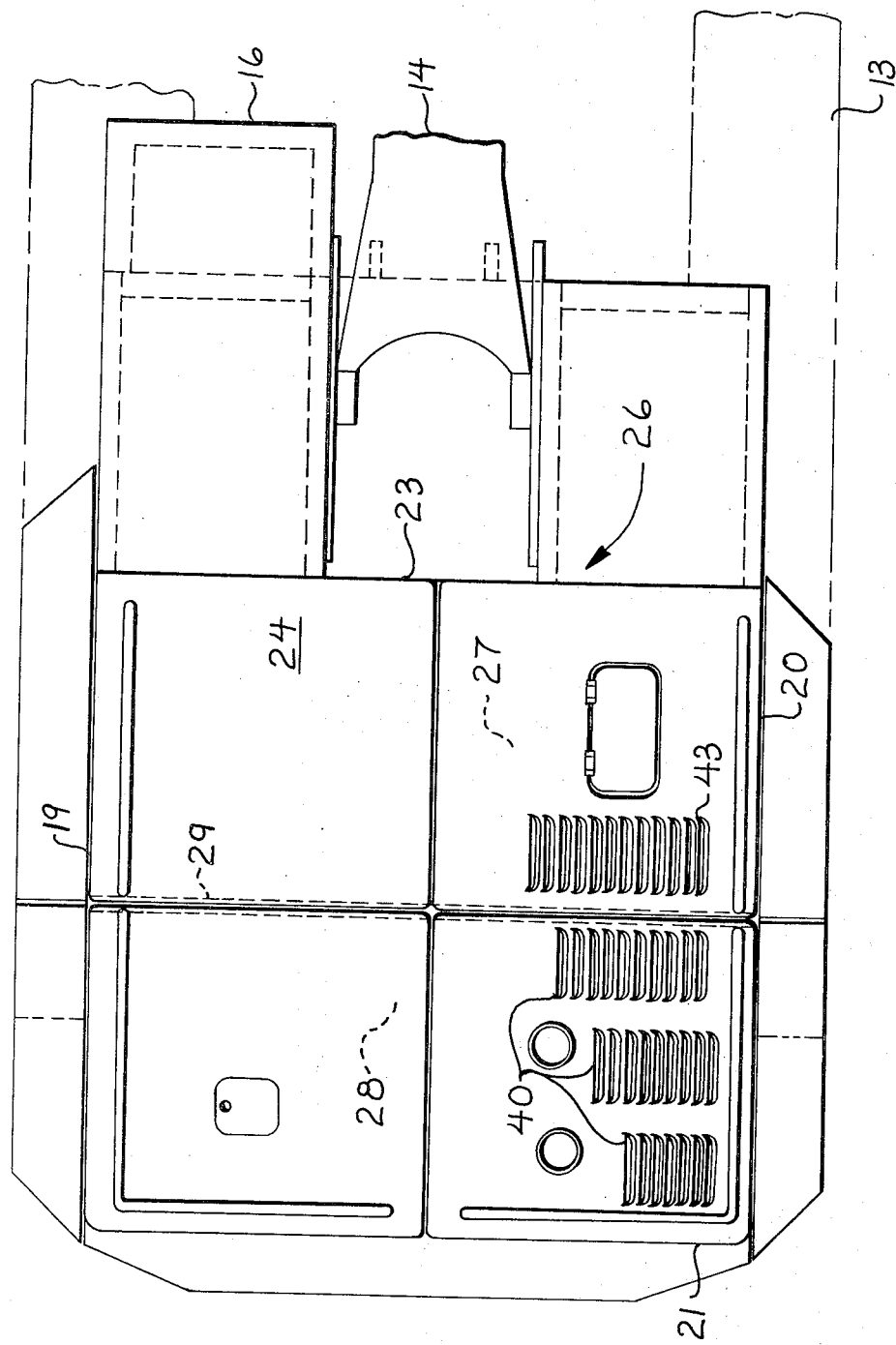
FIG. 2 is a top plan view of the body and cab portion of an hydraulic excavator vehicle further illustrating the top air vents in the roof portion thereof.
Figure 3:
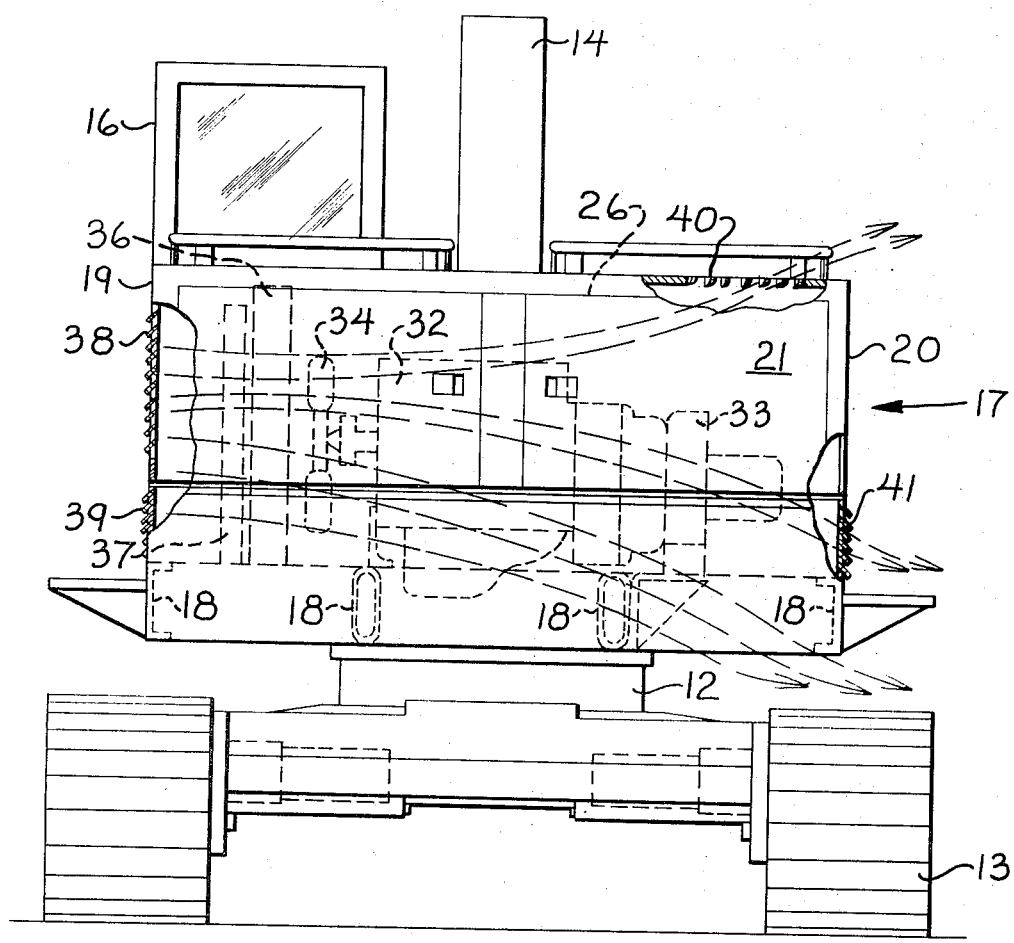
FIG. 3 is a rear elevation of an all hydraulic excavator vehicle including a schematic illustration of the placement of the heat exchangers for both the prime mover and the hydraulic system pumps, as well as the prime mover and pumps themselves.
Figure 4:
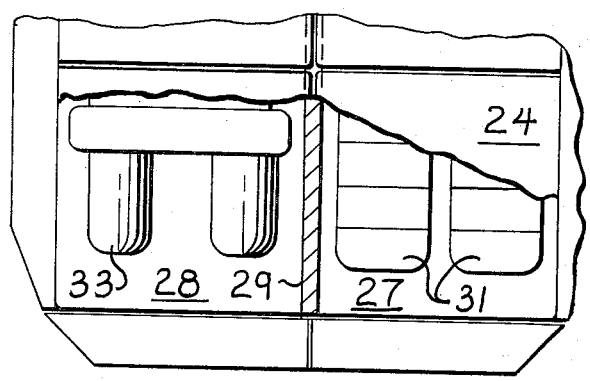
FIG. 4 is a top plan view of a portion of the body of an hydraulic excavator vehicle with part of the top cut away to illustrate the placement of the dividing fire wall between the separate compartments in the body.

With reference to FIGS. 1, 2 and 3 of the drawing, an hydraulic excavator vehicle 10 comprises a body and cab 11 that is supported by means of a turntable 12 on a tracked carriage structure 13. A boom 14 (only part of which is shown) is mounted on horizontal transverse pivots 15 to the center of the forward portion of the body and cab structure 11.

The front left-hand portion of structure 11 comprises the vehicle operator's cab 16, while the entire rearward portion comprises the body 17 that includes a support frame 18 upon which left and right side walls 19 and 20 respectively, as well as rear wall 21, are supported. A front wall 23 along with side walls 19, 20 and rear wall 21 in turn support a roof 24, all of which combine to enclose the prime mover and machinery housing 26.

Prime mover and machinery housing 26 is in turn divided into a forward compartment 27 and a rearward compartment 28 by a transverse fire wall 29 that extends between frame 18 and roof structure 24 and side walls 19 and 20.

Within forward compartment 27 is located the hydraulic system reservoir (not shown) and all of the necessary hydraulic system valve mechanisms and directly associated circuitry 31, all of which is supported by frame 18 and associated strut and floor structure where necessary. In rearward compartment 28 is located the vehicle prime mover engine 32 and the hydraulic system pumps 33 that are closely associated with said prime mover and are driven thereby.

The prime mover and associated hydraulic pump mechanisms are placed transversely of the longitudinal axis of the excavator vehicle and are spaced from left-hand wall 19 a sufficient distance to allow room for the engine driven suction fan 34, engine coolant radiator 36 and hydraulic fluid heat exchanger 37 to be placed therebetween. Both radiator 36 and hydraulic fluid heat exchanger 37 are placed such that air flows therethrough in a direction normal to the longitudinal axis of the excavator vehicle.

Side wall 19 is provided with air inlets or grills 38 and 39 directly adjacent hydraulic fluid heat exchanger 37 and additional air exits from compartment 28 are provided by means of louvers 40 arranged along the right-hand portion of roof 24, as well as by louvers 41 formed into the lower rearward portion of right-hand wall 20. In addition, where not blocked by the prime mover or hydraulic pump structures, frame 18 is open to permit the downwardly exit of air from compartment 28.

Forward compartment 27 is open to the circulation of air from outside the vehicle through louvers 42 situated in the lower forward portion of wall 19, through louvers 43 in the right-hand portion of roof 24, and, of course, through the open portions in frame 18.

With the vehicle in operation cooling is effected as follows:

Suction fan 34 coupled to prime mover engine 32 sucks air through the engine coolant radiator 36 immediately adjacent thereto and air is in turn sucked through hydraulic fluid heat exchanger 37 which is placed immediately upstream of the engine coolant radiator. Air is in turn sucked through grilled inlets 38 and 39 in the left wall of the body 11. Having passed over the heat exchanger units, the air is then driven over the surface of the engine 32 and from thence past the hydraulic pumps 33 from whence it exits through louvers 40 and 41 as well as out through the openings between frame 18. Thus it will be seen that fan forced air passes through the heat exchanger units for both the hydraulic system and the engine, over the engine itself, as well as the associated hydraulic pumps.

Any heat build-up in the hydraulic fluid reservoir the hydraulic valves and associated circuitry located in forward compartment 27 heats the air immediately surrounding this equipment and this air in turn passes by convection through louver 43 in roof 24, while fresh exterior air is brought into the compartment through grill 42, as well as through the openings between the members of frame 18. It will be appreciated that the heat generated or developing in the components in compartment 27 is a great deal less than that developing in the components situated in compartment 28, whereby no positive forced ventilation is necessary in the forward compartment of the body.

It will also be appreciated that the fire wall 29 separating compartments 27 and 28 serves a two-fold purpose. First, it reduces the fire hazard in the vehicle in the event of hydraulic fluid leakage from the valves and associated circuitry in compartment 27. Any such leaks of high pressure fluid will be isolated from the high temperature components in compartment 28. In addition since fire wall 29 runs transversely across the entire body portion of the vehicle, it acts as a sound barrier to insulate the noise of the engine and pump components from the operator who occupies the cab in the extreme forward portion of structure 11.

It will be understood of course that where necessary, provision is made in fire wall 29 for the passage of control cables, hydraulic system and fuel components therethrough.

There has been described hereinabove only the preferred embodiment of the hydraulic excavator cooling system of the invention. It will be apparent that additions and modifications may be made thereto without departing from the spirit of the invention, and all such additions and/or modifications are intended to be encompassed herein to the extent that they fall under the claims as set forth below.

What is claimed is:

1. In an hydraulic excavator vehicle that is powered by a prime mover and has an hydraulic system driven by said prime mover, said hydraulic system including pumps, valves, a fluid reservoir, fluid circuits and motors and further including a body structure for housing the prime mover and at least a portion of the hydraulic system, said body structure including a support frame, left and right side walls, a forward wall, a rear wall and a roof; the improvement comprising a cooling system including a firewall extending transversely across said body structure to divide said structure into front and rear compartments, the prime mover and attached pumps mounted in said rear compartment transverse to the longitudinal axis of said vehicle, an air inlet opening defined by one side wall of said structure and in alignment with said prime mover, a suction fan interposed between said prime mover and said inlet opening, a prime mover coolant radiator interposed between said prime mover and said inlet opening, and an hydraulic fluid heat exchanger further interposed between said prime mover and said inlet opening, air exhaust openings defined by the other side wall adjacent said pumps, and additional air exhaust openings defined by said roof, and by said support frame, the hydraulic fluid reservoir, valves and contiguous circuitry mounted in said front compartment, and said one side wall, roof and frame defining air openings for ventilating said front compartment.

2. The cooling system of claim 1 wherein said prime mover coolant radiator is mounted between said fan and said air inlet opening.

3. The cooling system of claim 2 wherein said hydraulic fluid heat exchanger is mounted between said coolant radiator and said air inlet opening.

4. In an excavator body structure utilized for housing a prime mover engine and an hydraulic system including pump means, valves, a fluid reservoir and fluid circuitry, the improvement comprising first compartment means for partially enclosing and housing said engine and said hydraulic pump means, second compartment means for partially enclosing and housing said fluid reservoir, valves and fluid circuitry, and fire-wall means separating said first compartment from said second compartment for attenuating noise from said first compartment and for acting as a leakage and fire barrier and isolating the hydraulic fluid in said second compartment from heat produced in said first compartment.

5. The excavator body structure of claim 4 wherein an engine coolant radiator and an hydraulic fluid radiator are placed within said structure in said first compartment.

6. The body structure of claim 4 wherein said firewall means extend transversely of a fore and aft axis of said body structure and further completely divide said body structure into said first and second compartments.

* * * * *